(12) United States Patent
Hulubei (10) Patent No.: US 8,176,045 B2
(45) Date of Patent: May 8, 2012

(54) SYSTEMS AND METHODS FOR CROSS-STREET IDENTIFICATION

(75) Inventor: Tudor Hulubei, New York, NY (US)

(73) Assignee: Google Inc., Mountain View, CA (US)

( * ) Notice: Subject to any disclaimer, the term of this patent is extended or adjusted under 35 U.S.C. 154(b) by 401 days.

(21) Appl. No.: 12/412,458

(22) Filed: Mar. 27, 2009

(65) Prior Publication Data

US 2010/0250619 A1    Sep. 30, 2010

(51) Int. Cl.
*G01C 21/30* (2006.01)
*G06F 17/30* (2006.01)

(52) U.S. Cl. ............... 707/724; 707/920; 701/201

(58) Field of Classification Search .......... 707/920, 707/919, 724
See application file for complete search history.

(56) References Cited

U.S. PATENT DOCUMENTS

| | | | |
|---|---|---|---|
| 5,402,120 A * | 3/1995 | Fujii et al. ............ | 701/209 |
| 6,184,823 B1 * | 2/2001 | Smith et al. .......... | 342/357.31 |
| 7,680,861 B2 * | 3/2010 | Gray ..................... | 707/750 |
| 2003/0036844 A1 * | 2/2003 | Balasuriya ............ | 701/201 |
| 2003/0222819 A1 | 12/2003 | Karr et al. | |
| 2004/0054687 A1 * | 3/2004 | McDonough .......... | 707/104.1 |
| 2007/0016368 A1 * | 1/2007 | Chapin et al. ......... | 701/211 |
| 2007/0047782 A1 | 3/2007 | Hull et al. | |
| 2008/0021641 A1 * | 1/2008 | Kim ..................... | 701/209 |
| 2008/0094250 A1 | 4/2008 | Myr | |
| 2009/0216434 A1 * | 8/2009 | Panganiban et al. ... | 701/208 |

OTHER PUBLICATIONS

Schroedl, Mining GPS Traces for Map Refinement, Data Mining and Knowledge Discovery, 2004, 9, 59-87.*
Millman, Fast-lane forays made easier with Street Map's StreetSmart, PC Week, May 17, 1988, p. 73.*
MapReduce, http://en.wikipedia.org/wiki/MapReduce, downloaded Mar. 26, 2009, p. 6.
Hellerstein Joe, "Parallel Programming in the Age of Big Data", Sunday, Nov. 9, 2008, http://gigaom.com/2008/11/09/mapreduce-leads-the-way-for-parallel-programmimg/, downloaded Mar. 13, 2009, p. 2.
International Search Report and Written Opinion, PCT/US10/28638, dated May 12, 2010.

* cited by examiner

*Primary Examiner* — John E Breene
*Assistant Examiner* — Albert Phillips, III
(74) *Attorney, Agent, or Firm* — Lerner, David, Littenberg, Krumholz & Mentlik, LLP (57) ABSTRACT

Aspects of the invention relate to the use of electronic maps and providing information about intersecting streets. A given region of interest on a map may include any number of features. Features of interest, including road segments and intersections, can be filtered to remove non-street data. The results may be analyzed according to individual street segments. Each segment may be identified by a feature ID, and the relationship each segment has with a given intersection is analyzed. Thus, the direction of a segment into or out of an intersection is determined, along with the physical locations of the beginning and end of the segment. This information is used to provide robust map information that may be displayed to a user. Heuristics can be applied to the map information to provide coherent address or direction information to the user for a given point of interest.

9 Claims, 10 Drawing Sheets

Intersection of 7th Avenue, 45th Street and Broadway

FIG. 5B

"725 5th Ave. #2 between East 56th Street and East 57th Street" or
"725 5th Ave. #2 between West 56th Street and West 57th Street"

FIG. 6B

"Coffee House, 304 West 58th St., NY, NY, between 8th and 9th Avenues, closer to 8th Ave"

FIG. 6A

"Coffee House, 684 8th Ave., NY, NY, between West 43rd & West 44th"

FIG. 6C
"Coffee House, 1530 Broadway, NY, NY, on the corner of Broadway and West 45th St."

SYSTEMS AND METHODS FOR CROSS-STREET IDENTIFICATION

BACKGROUND OF THE INVENTION

1. Field of the Invention

Aspects of the invention relate generally to electronic mapping applications. More particularly, aspects are directed to determination of cross-streets on electronic maps.

2. Description of Related Art

Figure 1:
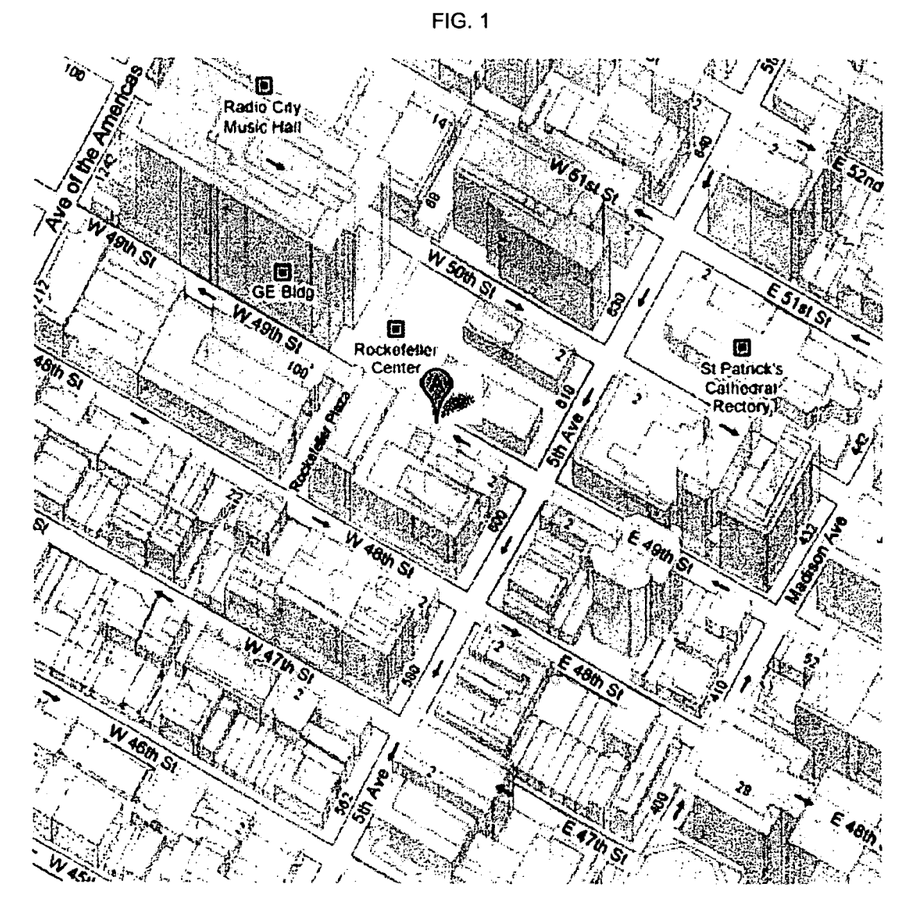
FIG. 1 is an exemplary map illustrating a point of interest.

Mapping applications can be used to identify points of interest in a particular area. For example, FIG. 1 illustrates a portion of New York City, and includes 57 West $49^{th}$ Street as a point of interest (A). Existing systems enable a user to locate a point of interest and obtain directions to this location from another location. While such directions to a point of interest may be very useful, they provide a limited amount of information regarding the surrounding area in general, and the streets near or adjacent the point of interest in particular.

Systems and methods are recited herein to provide enhanced location information to users, for instance with regard to geographical points of interest on an electronic map.

SUMMARY OF THE INVENTION

In accordance with one embodiment of the invention, a method comprises identifying a plurality of streets and at least one intersection thereof, the plurality of streets and the at least one intersection being associated with a region of interest of a map, each of the plurality of streets including at least one road segment; extracting features from a map database for each road segment and the at least one intersection; creating, for each intersection of interest, a set of road segments connected to that intersection and a relationship of each road segment in the set to that intersection, including whether a given road segment begins or ends at the intersection; and storing the set of road segments and their relationships to the intersection of interest in a cross-street database.

In one alternative, the method further comprises keying each feature extracted from the map database with a corresponding ID; identifying all road segments associated with a particular intersection; and identifying the relationship between each road segment and the particular intersection. In this case, the method may also comprise generating a skeleton of each road segment keyed by the corresponding ID; matching individual road segments with respective ones of the skeletons; and generating a full representation of each road segment.

In another alternative, the method further comprises retrieving the set of road segments and their relationships to the intersection of interest from the cross-street database; applying a heuristic to the retrieved set; and displaying a geographical map on a display to show at least some of the road segments based upon the heuristic. Here, the heuristic may generate a street identification based upon at least one of how important each road segment is and an angle of impingement of each road segment on a street of interest.

In a further alternative, the method further comprises identifying all cross-streets of the intersection of interest by road segment IDs, each cross street comprising at least one of the road segments; retrieving original features of interest from the map database; filtering non-road segments from the original features of interest to obtain a set of filtered road segments; matching each cross-street of the intersection of interest with the filtered road segments; and storing the matched cross-streets in the cross-street database. In one example, retrieving the original features, filtering the non-road segments and matching each cross-street are done by road segment ID.

In another example, the method further comprises retrieving selected matched cross-streets from the cross-street database in response to a user query; applying a heuristic to the retrieved cross-streets to select a display option; and displaying a geographical map on a display to identify cross-street information based upon the display option. Here, the display option may report the cross-street information in increasing order of street numbers. Alternatively, the display option reports the cross-street information without mixing cardinal directions if alternative cross-streets that are on the same cardinal direction exist. Optionally, the method here further comprises determining a distance between a point of interest on the geographical map and endpoints of the cross-street on which the point of interest is located. In this case, the display option may report a location of the point of interest in relation to the cross-street on which the point of interest is located.

In accordance with another embodiment of the invention, a processing system for processing geographical map information comprises at least one processor and memory for storing data. The memory is electrically coupled to the at least one processor. The at least one processor is configured to identify a plurality of streets and at least one intersection thereof, the plurality of streets and the at least one intersection being associated with a region of interest of a map, each of the plurality of streets including at least one road segment, to extract features from a map database for each road segment and the at least one intersection, to create, for each intersection of interest, a set of road segments connected to that intersection and a relationship of each road segment in the set to that intersection, including whether a given road segment begins or ends at the intersection, and to store the set of road segments and their relationships to the intersection of interest in a cross-street database in the memory.

In one example, the at least one processor is further configured to retrieve the set of road segments and their relationships to the intersection of interest from the cross-street database, to apply a heuristic to the retrieved set, and to display a geographical map on a display to show at least some of the road segments based upon the heuristic.

In another example, the at least one processor is further configured to identify all cross-streets of the intersection of interest by road segment IDs, each cross street comprising at least one of the road segments, to retrieve original features of interest from the map database, to filter non-road segments from the original features of interest to obtain a set of filtered road segments, to match each cross-street of the intersection of interest with the filtered road segments, and to store the matched cross-streets in the cross-street database.

And in an additional example, the at least one processor is further configured to retrieve selected matched cross-streets from the cross-street database in response to a user query, to apply a heuristic to the retrieved cross-streets to select a display option, and to display a geographical map on a display to identify cross-street information based upon the display option.

In accordance with a further embodiment of the invention, a computer-readable recording medium is provided. The recording medium includes stored instructions which, when executed by a processor, cause the processor to perform the operations of identifying a plurality of streets and at least one intersection thereof, the plurality of streets and the at least one intersection being associated with a region of interest of a map, each of the plurality of streets including at least one road segment; extracting features from a map database for each road segment and the at least one intersection; creating, for each intersection of interest, a set of road segments connected to that intersection and a relationship of each road segment in the set to that intersection, including whether a given road segment begins or ends at the intersection; and storing the set of road segments and their relationships to the intersection of interest in a cross-street database.

DETAILED DESCRIPTION

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

Figure 2:
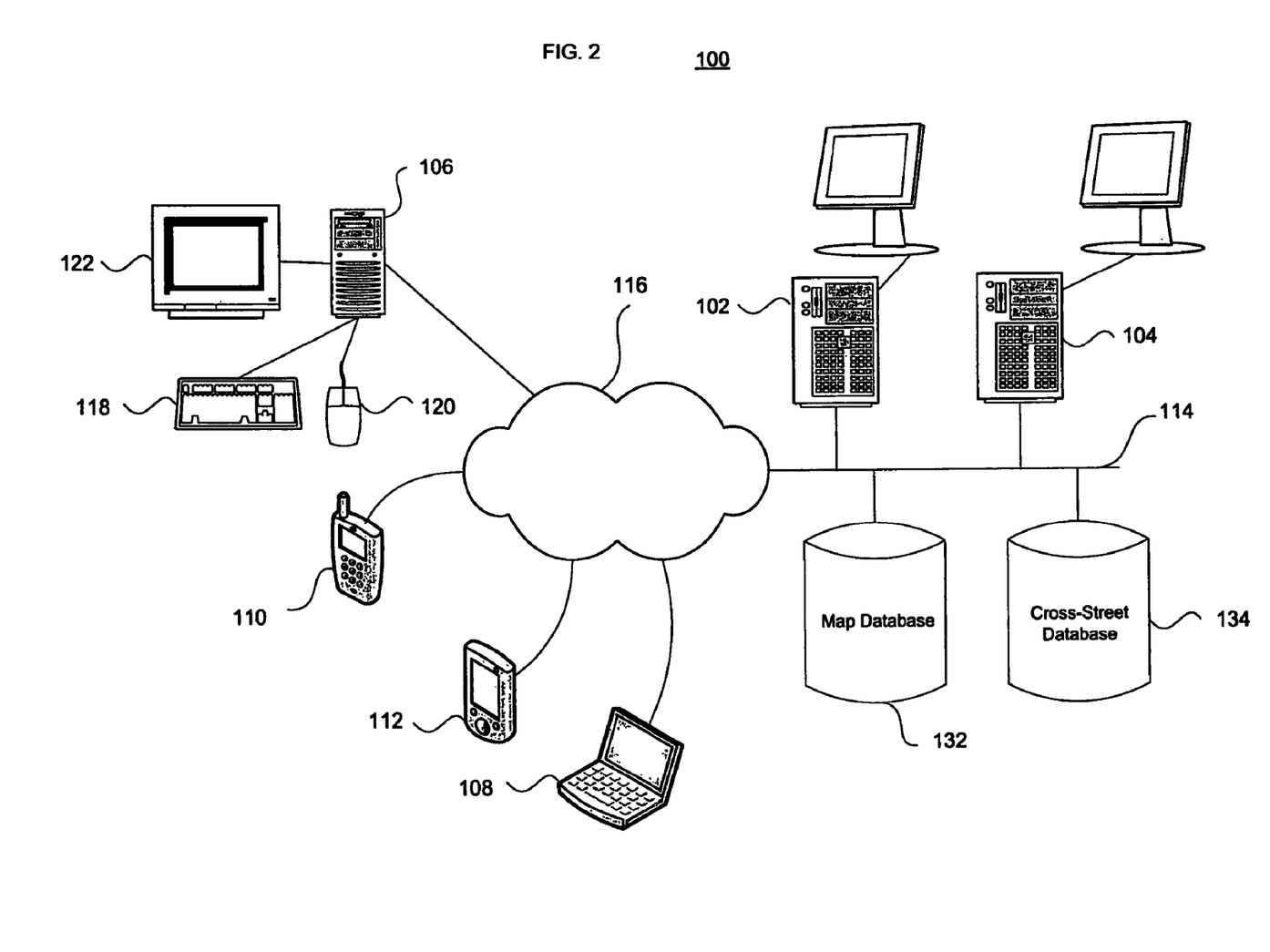
FIG. 2 illustrates a computer system for use with aspects of the invention.

FIG. 2 presents a schematic diagram of a computer system depicting various computing devices that can be used alone or in a networked configuration in accordance with aspects of the invention. For example, this figure illustrates a computer network 100 having a plurality of computers 102, 104, 106 and 108 as well as other types of devices such as portable electronic devices such as a mobile phone 110 and a PDA 112. The computer processing systems may be interconnected via a local bus or direct connection 114 and/or may be coupled via a communications network 116 such as a LAN, WAN, the Internet, etc. and which may be wired or wireless.

Figure 3:
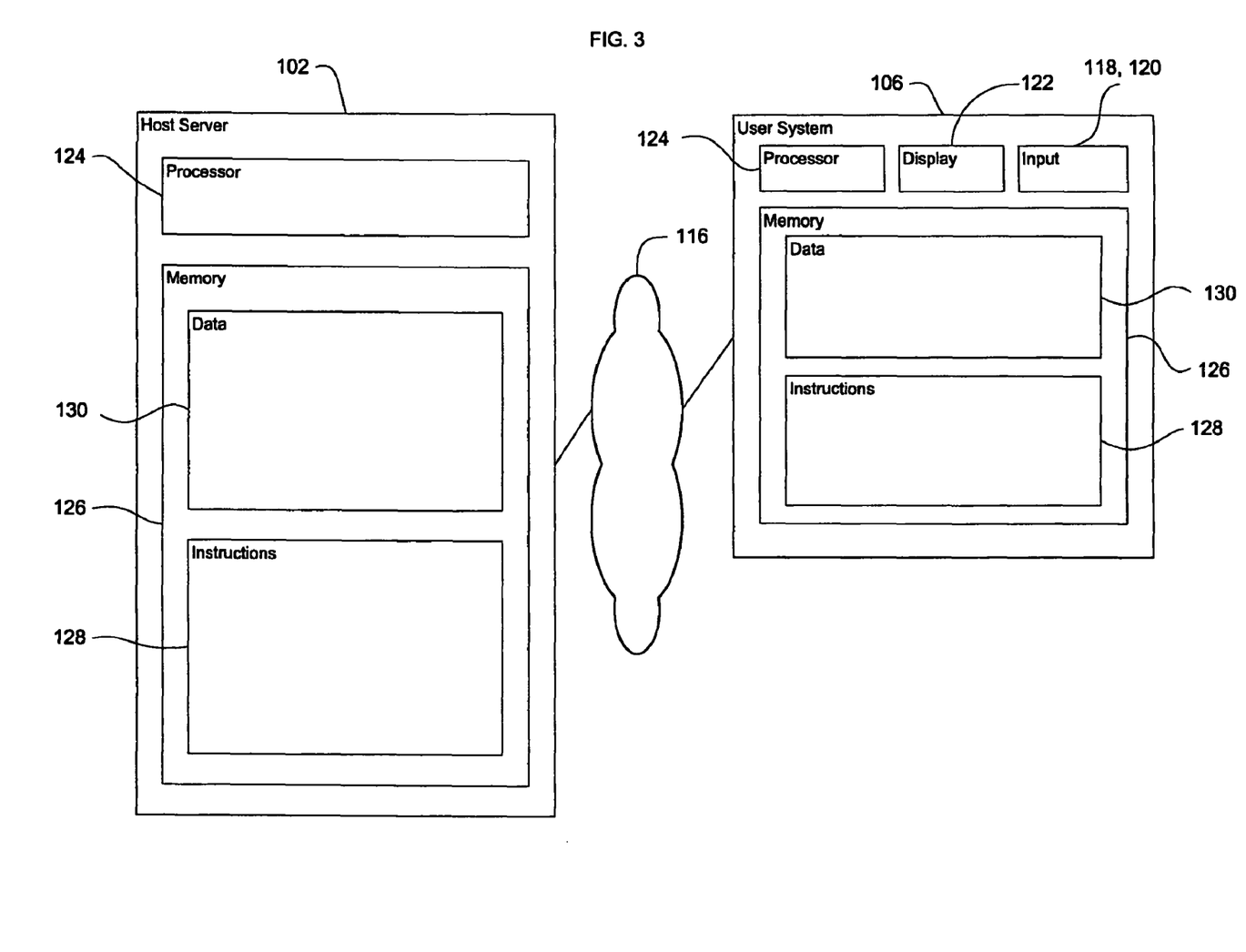
FIG. 3 illustrates features of the system of FIG. 2.

Each computer processing system can include, for example, one or more computing devices having user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106 and 108 may be a personal computer, server, etc. By way of example only, computer 106 may be a personal computer while computers 102 and 104 may be servers, and computer 108 may be a laptop. As shown in FIG. 3 each computer contains a processor 124, memory/storage 126 and other components typically present in a computer.

Memory/storage 126 stores information accessible by processor 124, including instructions 128 that may be executed by the processor 124 and data 130 that may be retrieved, manipulated or stored by the processor. The memory/storage may be of any type or any device capable of storing information accessible by the processor, such as a hard-drive, ROM, RAM, CD-ROM, flash memories, write-capable or read-only memories. The processor 124 may comprise any number of well known processors, such as processors from Intel Corporation. Alternatively, the processor may be a dedicated controller for executing operations, such as an ASIC.

The instructions 128 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 130 may be retrieved, stored or modified by processor 124 in accordance with the instructions 128. The data may be stored as a collection of data. For instance, although the invention is not limited by any particular data structure, the data may be stored in computer registers, in a relational database as a table having a plurality of different fields and records, XML documents, or flat files. Certain image-related data such as map data may be stored in flat files such as keyhole flat files ("KFF").

The data may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 124 and memory 126 are functionally illustrated in FIG. 3 as being within the same block, it will be understood that the processor and memory may actually comprise multiple processors and memories that may or may not be stored within the same physical housing or location. For example, some or all of the instructions and data may be stored on a removable CD-ROM or DVD-ROM while others are stored on a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 326 such as hard drives or the like.

In one aspect, server 102 communicates with one or more client computers 106 and/or 108, as well as server 104 and devices such as mobile phone 110 and PDA 112. Each client computer or other processing device may be configured similarly to the server 102, with a processor, memory and instructions, as well as one or more user input devices 118, 120 and a user output device, such as display 122. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 104 and client computers and other processing devices are capable of direct and indirect communication with other computers, such as over network 116. Although only a few computing devices are depicted in FIGS. 2-3, it should be appreciated that a typical system can include a large number of connected servers and clients, with each different computer being at a different node of the network. The network 116, and intervening nodes, may comprise various configurations and protocols including the Internet, intranets, virtual private networks, wide area networks, local networks, private networks using communication protocols proprietary to one or more companies, Ethernet, WiFi, Bluetooth and TCP/IP.

Communication across the network, including any intervening nodes, may be facilitated by any device capable of transmitting data to and from other computers, such as modems (e.g., dial-up or cable), network interfaces and wireless interfaces. Server 102 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, DVD-ROM, flash memory, USB drive or directly between two computer systems via a dial-up modem. In other aspects, the information may be transmitted in a non-electronic format and manually entered into the system.

Moreover, computers and client devices in accordance with the systems and methods described herein may comprise any device capable of processing instructions and transmitting data to and from humans and other computers, including network computers lacking local storage capability, PDA's with modems such as PDA 112 and Internet-capable wireless phones such as mobile phone 110.

As shown in FIG. 2, the network 100 may also include a map database 132 and/or a cross-street database 134. The map database 132 and the cross-street database 134 may be directly or indirectly coupled to servers 102 and/or 104. In an alternative, the map database 132 and the cross-street database 134 may be part of or otherwise logically associated with the server 102. The map database 102 may store data 130 in one or more KFFs.

Returning to FIG. 1, point of interest (A) is shown on $49^{th}$ Street between $5^{th}$ Avenue and Avenue of the Americas ($6^{th}$ Avenue). Identification of this cross-street information may be very important to someone traveling to the point of interest, as it can help the person to quickly find the place while traveling on $49^{th}$ Street. Similarly, it may be important to identify whether a point of interest is closer to a given cross-street, or whether the point of interest is located at an intersection.

Figure 4A:
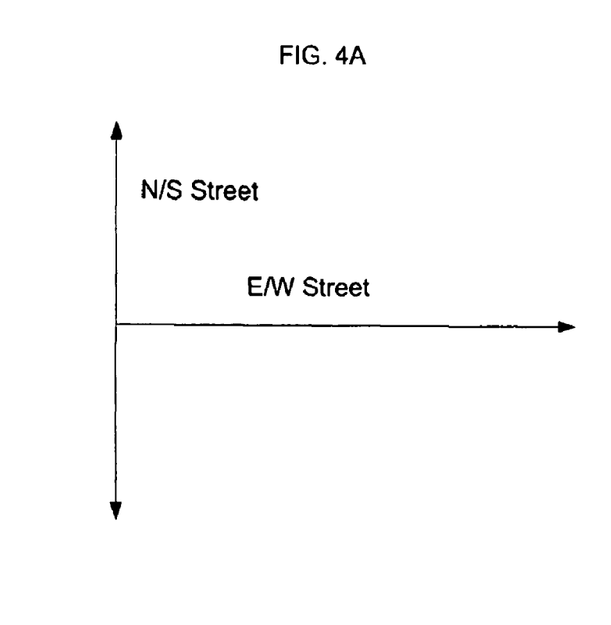
FIGS. 4A-B illustrate an exemplary cross-street scenario in accordance with aspects of the invention.

One aspect of the invention determines cross-streets for each segment of a road within a particular area of a map. By way of example only, FIG. 4A illustrates a pair of intersecting streets, namely a North/South street and an East/West street. Street information may be maintained in an electronic map that is stored in map database 132. The database may maintain a set of geographical data, which may be maintained in a KFF format or some other database format. Each portion of a street and each intersection is uniquely identified by a feature ID.

As used herein, a street comprises a collection of one or more road segments. Each road segment, e.g., the portion of a street between a pair of intersections, is directional. Intersections are made up of two sets of unique identifiers, namely road segments which originate from an intersection and road segments which terminate in the intersection. Geographical data representing both road segments and intersections may contain additional data about them, such as their prominence, coordinates (e.g., GPS coordinates), bounding boxes, addresses, etc.

Figure 4B:
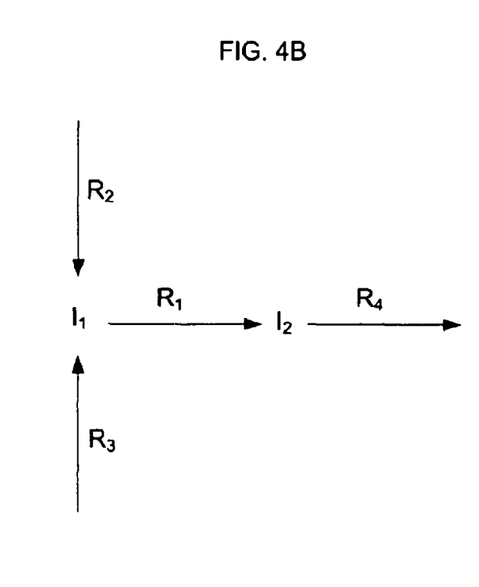

Turning to FIG. 4B, the North/South and East/West streets may be analyzed in terms of their road segments. In particular, four road segments $R_1$, $R_2$, $R_3$, and $R_4$ are connected by two intersections, $I_1$ and $I_2$. In particular, the North/South street is represented a pair of road segments $R_2$ and $R_3$. And the East/West street is represented by the pair of road segments $R_1$ and $R_4$. The $R_2$ and $R_3$ road segments meet at and go into intersection $I_1$. Road segment $R_1$ goes out of intersection $I_1$ and into intersection $I_2$. Segment $R_4$ goes out of intersection $I_2$. These relationships may be represented in a MapReduce format as:

$I_1=\{\{R_2, R_3\}, \{R_1\}\}$
$I_2=\{\{R_1\}, \{R_4\}\}$

While only a few road segments and intersections are provided in this example, it should be understood that an electronic map may include anywhere from a few features to millions of features, which may result in a substantial amount of geographical data. Given the amount of data that is subject to processing, a framework such as MapReduce by Google that can manage such processing across a large number of computers or network nodes may be employed. Processing may be parallelized among multiple computers, such as servers 102 and 104 of FIG. 2, to improve speed. The following notation is used to denote the output of a MapReduce phase:

(key$_1$,key$_2$),value+{annotations}

Each MapReduce phase includes a "mapper" phase, which outputs values keyed by a primary key (key$_1$) and a secondary key (key$_2$). The keys are IDs associated with a given feature. Values include data corresponding to such features. And annotations may include extensions to a value.

Mapper invocations can be executed in parallel on different machines such as servers 102 and 104 of FIG. 2 as discussed above. A subsequent "shuffling" phase groups all entries based on their primary key and passes them to the final phase (the "reducer"). A call to a reducer is made once for each group of values having the same primary key with the values sorted by their secondary key. The processing of different groups of values having the same primary key can happen in parallel on reducers running on different machines.

In the present embodiment, when identifying a road segment or intersection in the key slot, we refer to its ID (e.g., $R_1$, $I_2$). Similarly, when identifying a feature (e.g., road segment or intersection) in the value slot, reference is made to aspects of the feature such as a list of road segments into and out of an intersection. Other data which may be included in the value include feature IDs, a vector of coordinates such as GPS coordinates, address information (e.g., street name, county, state, zip code, range of house numbers along a given road segment). Secondary keys are optional and may be left blank.

Feature extraction may occur in a mapper phase. Here, the mapper extracts from a geographical database, e.g., map database 132, all features representing road segments and intersections. Such features are output keyed by their corresponding ID. Other data which is not of interest is desirably filtered out to minimize the amount of data processing that is performed in subsequent stages. The output is fed as an input to the next phase of the process. In the example of FIG. 4B, the output of this mapper phase is as follows:

($R_1$,),$R_1$
($R_2$,),$R_2$
($R_3$,),$R_3$
($R_4$,),$R_4$
($I_1$,),$I_1$
($I_2$,),$I_2$

Here, it can be seen that there are no secondary keys and no annotations. The primary key ID, such as ($R_1$,) is followed by feature data for the given road segment $R_1$. Next, road segments (cross-roads) are identified for each intersection. In particular, for each intersection I={$R_1$, $R_2$, . . . , $R_n$}, the mapper outputs a skeleton of each participating road segment $R_i$ n−1 times, once for each other participating road segment $R_j$, keyed by $R_j$'s ID. To keep track of the relationship between the road segments, the secondary key may be set to "B" (beginning) if the output road segment $R_i$ originates at the current intersection or "E" (end) if $R_i$ terminates in the current intersection. The application thus creates the set of all the road segments in the map database 132. This is repeated once for each cross-road (at both endpoints), each time keyed by the ID of the corresponding cross-road. Thus, in the example of FIG. 4B, for $I_1$ the results are as follows:

($R_2$,B),$R_1$
($R_3$,B),$R_1$
($R_1$,E),$R_2$
($R_3$,E),$R_2$
($R_1$,E),$R_3$
($R_2$,E),$R_3$

And for $I_2$:

($R_4$,E),$R_1$
($R_1$,B),$R_4$

With regard to intersection $I_1$, there are three associated road segments $R_1$, $R_2$ and $R_3$. As shown in the first combination with road segment (cross-road) $R_2$, the secondary key is set to B because the output road segment ($R_1$) originates at intersection $I_1$. For road segments (cross-roads) $R_2$ and $R_3$, the secondary key is set to E because both $R_2$ and $R_3$ terminate at intersection $I_1$.

For each road segment $R_i$, the application may process the road segment by only passing road segment data as part of the mapper process. Thus, for the road segments $R_1$ through $R_4$, the results would be:

(R1,),R1
(R2,),R2
(R3,),R3
(R4,),R4

The application then applies a reducer phase to match individual road segments with road skeletons created by the mapper. The road skeleton may include, at a minimum, a primary key ID. Here, this ID is then matched with an individual road segment and its associated map/location data. As the key is the ID of a cross-road, the result is a full representation of a road segment for each cross-road at an intersection. For instance, a given road section may be annotated with the IDs of all the road segments it intersects, keyed by its own ID. Thus, annotations may be prefixed with "B–" or "E–" depending upon whether a given cross-road intersects the road segment at its beginning or at its end. In the present example, the input keyed on road segment $R_1$ is as follows:

($R_1$,E),$R_2$
($R_1$,E),$R_3$
($R_1$,B),$R_4$
($R_1$,),$R_1$

Here, the first input row above includes $R_1$ as the primary key, with "E" as the secondary key indicating that road segment $R_2$ terminates at road segment $R_1$. The first input row also includes the value (data) for road segment $R_2$. The output for key $R_1$ may be represented as follows:

($R_1$,),$R_1$+{E−$R_2$,E−$R_3$,B−$R_4$}

Here, the primary key ($R_1$,) is followed by the value (data) for road segment $R_1$, which is annotated with information for the other road segments intersecting with $R_1$. Thus, as road segments R2 and R3 terminate at the intersection with R1, this information is represented by E−R2 and E−R3. And as road segment R4 begins at the intersection with R1, this information is represented by B−R4. The inputs and outputs keyed on the remaining road segments are as follows. The input keyed on $R_2$ is:

($R_2$,B),$R_1$
($R_2$,E),$R_3$
($R_2$,),$R_2$

The output for key $R_1$ is:

($R_2$,),$R_2$+{B−$R_1$,E−$R_3$}

The input keyed on $R_3$ is:

($R_3$,B),$R_1$
($R_3$,E),$R_2$
($R_3$,),$R_3$

The output for key $R_3$ is:

($R_3$,),$R_3$+{B−$R_1$,E−$R_2$}

The input keyed on $R_4$ is:

($R_4$,E),$R_1$
($R_4$,),$R_4$

The output for key $R_4$ is:

($R_4$,),$R_4$+{E−$R_1$}

Putting all outputs together, we get:

($R_1$,),$R_1$+{E−$R_2$,E−$R_3$,B−$R_4$}
($R_2$,),$R_2$+{B−$R_1$,E−$R_3$}
($R_3$,),$R_3$+{B−$R_1$,E−$R_2$}
($R_4$,),$R_4$+{E−$R_1$}

Thus, it can be seen that the representations for each road segment include the road segment ID and data for that road segment annotated with data for each intersecting road segment.

In a subsequent process, cross-streets may be identified by road segment ID. Here, the application may retrieve a set of cross-roads keyed by their own IDs annotated with the IDs of the road segments they intersect with. The application may apply a first mapper that outputs each cross-road once for every one of the road segments it intersects, keyed by the ID of the respective road segment. The secondary key may be identified as a "B" or an "E", depending upon whether a given cross-road intersects the other road segment at the other road segment's beginning or end. In this example, the output for $R_1$ is as follows:

($R_2$,E),$R_1$
($R_3$,E),$R_1$
($R_4$,B),$R_1$

The output for $R_2$ is:

($R_1$,B),$R_2$
($R_3$,E),$R_2$

The output for $R_3$ is:

($R_1$,B),$R_3$
($R_2$,E),$R_3$

And the output for $R_4$ is:

($R_1$,E),$R_4$

The application may also apply a second mapper routine which inputs the original features of interest and filters out everything that is not a road segment. The road segments passed to the reducer then become the annotated road segments in the final output of the reducer. In this example:

($R_1$,),$R_1$
($R_2$,),$R_2$
($R_3$,),$R_3$
($R_4$,),$R_4$

Subsequently, the application may apply a reducer that takes input from these first and second mappers and matches them based on the keys to create an annotated road segment output. This output may comprise a protocol buffer including a road segment and its cross-roads, including the relevant road information such as street name, direction vector, location coordinates, etc. For instance, for key $R_1$ the following input combinations are used:

$(R_1,B),R_2$
$(R_1,B),R_3$
$(R_1,E),R_4$
$(R_1,),R_1$

The result for road segment $R_1$ is:

$(R_1,),R_1+\{B-R_2,B-R_3,E-R_4\}$

Similarly, for key $R_2$, the following three inputs are combined:

$(R_2,E),R_1$
$(R_2,E),R_3$
$(R_2,),R_2$

The result for road segment $R_2$ is:

$(R_2,),R_2+\{E-R_1,E-R_3\}$

For key $R_3$, the following three inputs are combined:

$(R_3,E),R_1$
$(R_3,E),R_2$
$(R_3,),R_3$

The result for road segment $R_3$ is:

$(R_3,),R_3+\{E-R_1,E-R_2\}$

And for key $R_4$, the following two input are combined:

$(R_4,B),R_1$
$(R_4,),R_4$

The result for road segment $R_4$ is:

$(R_4,),R_4+\{B-R_1\}$

Putting these results together, the final output at this phase is:

$(R_1,),R_1+\{B-R_2,B-R_3,E-R_4\}$
$(R_2,),R_2+\{E-R_1,E-R_3\}$
$(R_3,),R_3+\{E-R_1,E-R_2\}$
$(R_4,),R_4+\{B-R_1\}$

This output shows the $R_1$ road segment has two cross-roads that intersect it at its beginning ($R_2$ and $R_3$), and one that intersects it at its end ($R_4$). $R_2$ and $R_3$ only have cross-roads that intersect them at their ends. And $R_4$ only has $R_1$ as a cross-road that intersects it at its beginning. This is consistent with what is shown in FIG. 4B. The resulting cross-road data may be stored in the cross-street database 134 of FIG. 2.

Once all the cross-streets for each road segment in a given geographical region have been determined, a next task may include choosing the ones that are identified to a user, such as in response to a map request. Different heuristics may be applied to determine not only the best cross-streets to present to the user, but also to determine the order in which the cross-streets are reported.

Figure 5A:
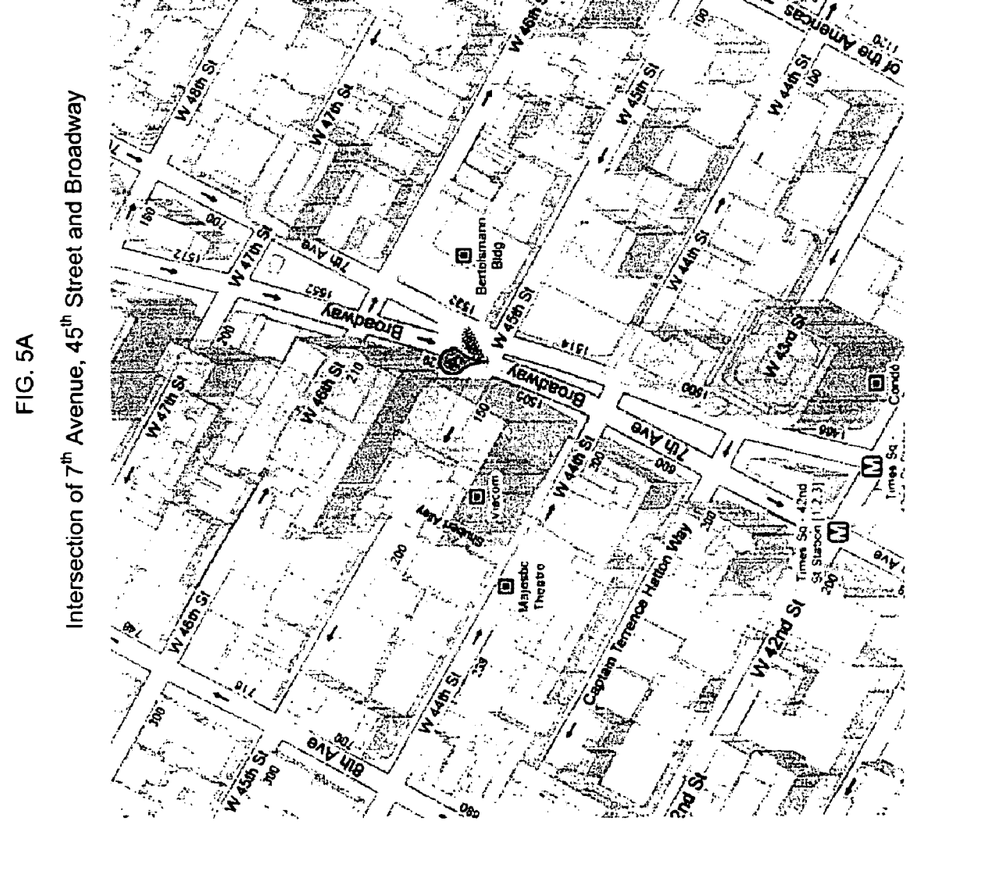
FIGS. 5A-B are exemplary maps illustrating intersections and points of interest in accordance with aspects of the invention.

Different factors may be employed, including the prominence of a given cross-street, i.e., how important the cross-street is. For example, if multiple cross-streets intersect a road segment at the same location, the cross-street that is larger, carries more traffic, or is more well-known may be used. FIG. 5A shows an intersection at $7^{th}$ Avenue in New York City having Broadway and $45^{th}$ Street as cross-streets. This may be presented to a user with a graphical user interface as either the intersection of $7^{th}$ Avenue and Broadway or the intersection of $7^{th}$ Avenue and $45^{th}$ Street. If Broadway is a more well-known street than $45^{th}$ Street, the caption may recite "$7^{th}$ Avenue at Broadway" or the "intersection of $7^{th}$ Avenue and Broadway" or the like.

Another factor is the angular intersection of the cross-street to a given road segment of interest. In one example, the cross-street that is more perpendicular to the segment of interest is reported. With regard to FIG. 5A in this case, it can be seen that $45^{th}$ Street intersects $7^{th}$ Avenue substantially perpendicularly while Broadway intersects it at a more acute angle. Thus, in this case the intersection may be reported as that of $7^{th}$ Avenue and $45^{th}$ Street.

In the two above examples, the reported cross street may differ depending upon which factor is selected. Alternatively, the factors may be weighted to determine which cross-street is reported. Thus, if the well-known street factor is given more weight than the perpendicular street, the intersection may be reported as $7^{th}$ Avenue and Broadway. In this case, the cross-streets may be given different weights depending upon the acuteness of the angle. Thus, a street at a 45° angle may be given a greater weight than a street at a 30° angle.

Figure 5B:
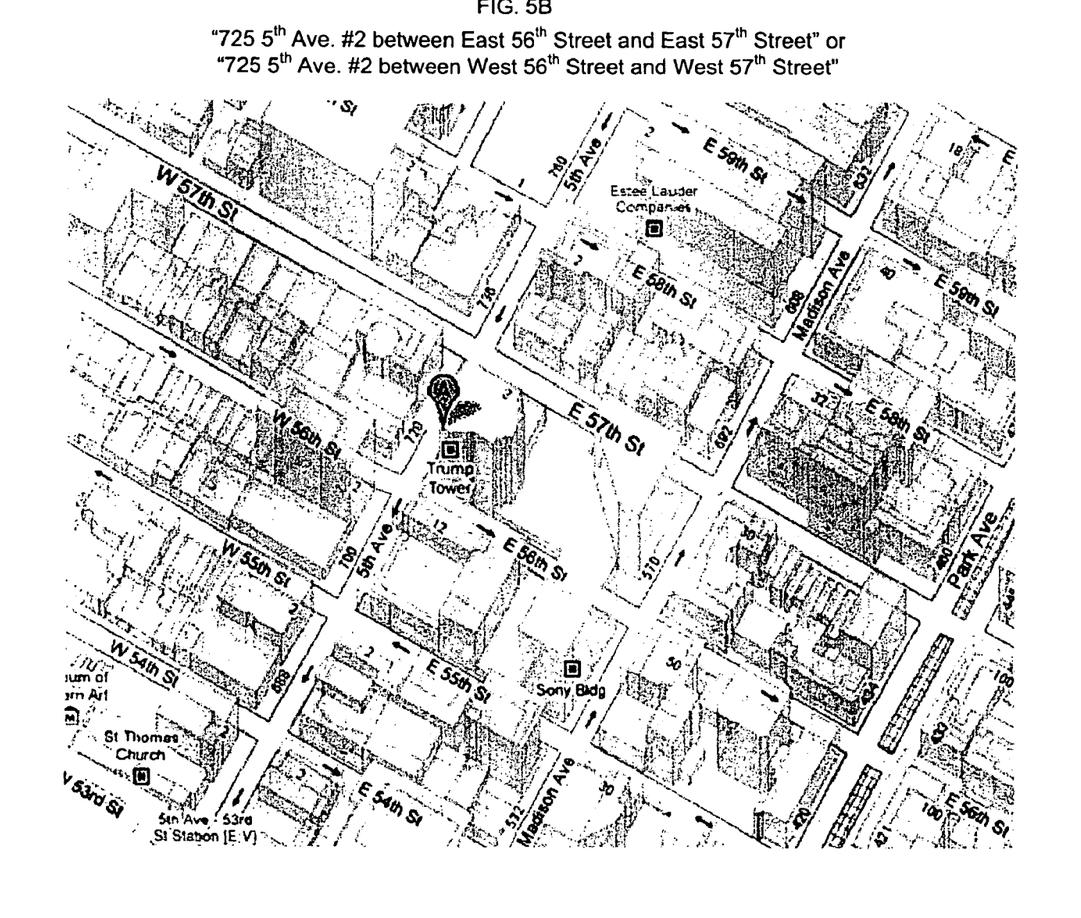

In another example, if streets are numbered (very common in certain U.S. cities), the cross-streets may be reported in increasing order of their number. For instance, FIG. 5B illustrates a point of interest at 725 5th Ave #2, New York, N.Y. The map presented to the user may be annotated with "between East 56th St. and East 57th St." rather than with "between East 57th St. and East 56th St."

In a further example, if road segments have cross-streets with different names on each side, the cross-streets on one side or the other are reported to avoid any confusion that mixing them would bring. For instance, opposing cardinal directions of the map (North and South or East and West) may not be mixed if alternative cross-streets that are on the same cardinal direction exist. For instance, it may be confusing to state, 725 5th Ave #2, New York, N.Y. "between East 56th St. and West 57th St." Instead, the annotation would state "between East 56th St. and East 57th St." or "between West 56th St. and West 57th St."

Figure 6A:
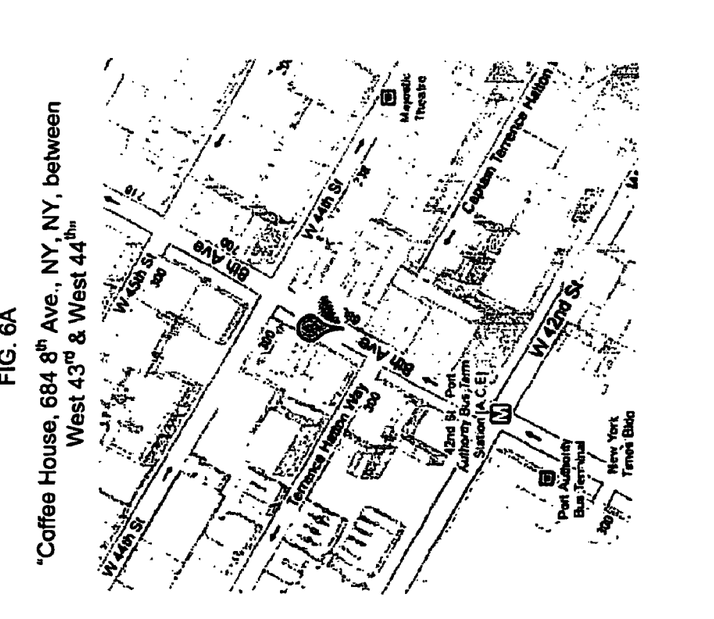
FIGS. 6A-C are exemplary maps illustrating intersections and points of interest in accordance with aspects of the invention.
Figure 6B:
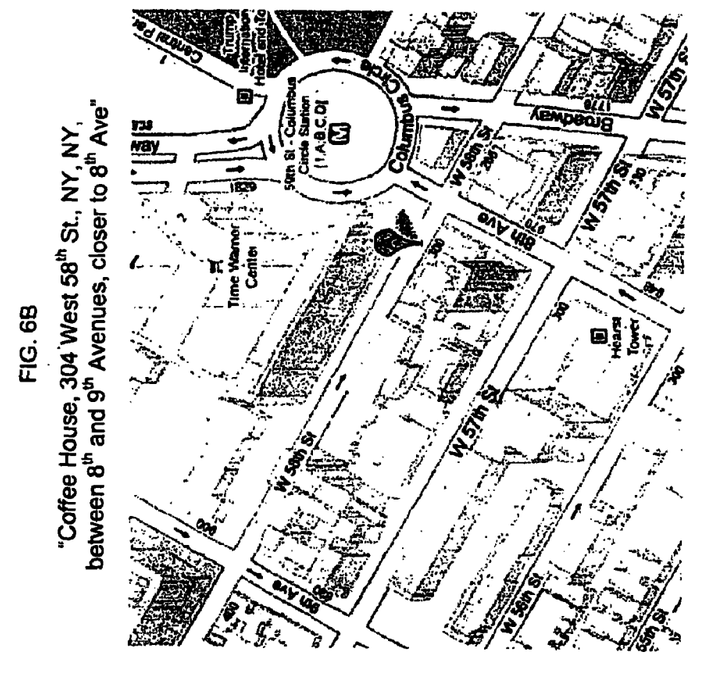
Figure 6C:
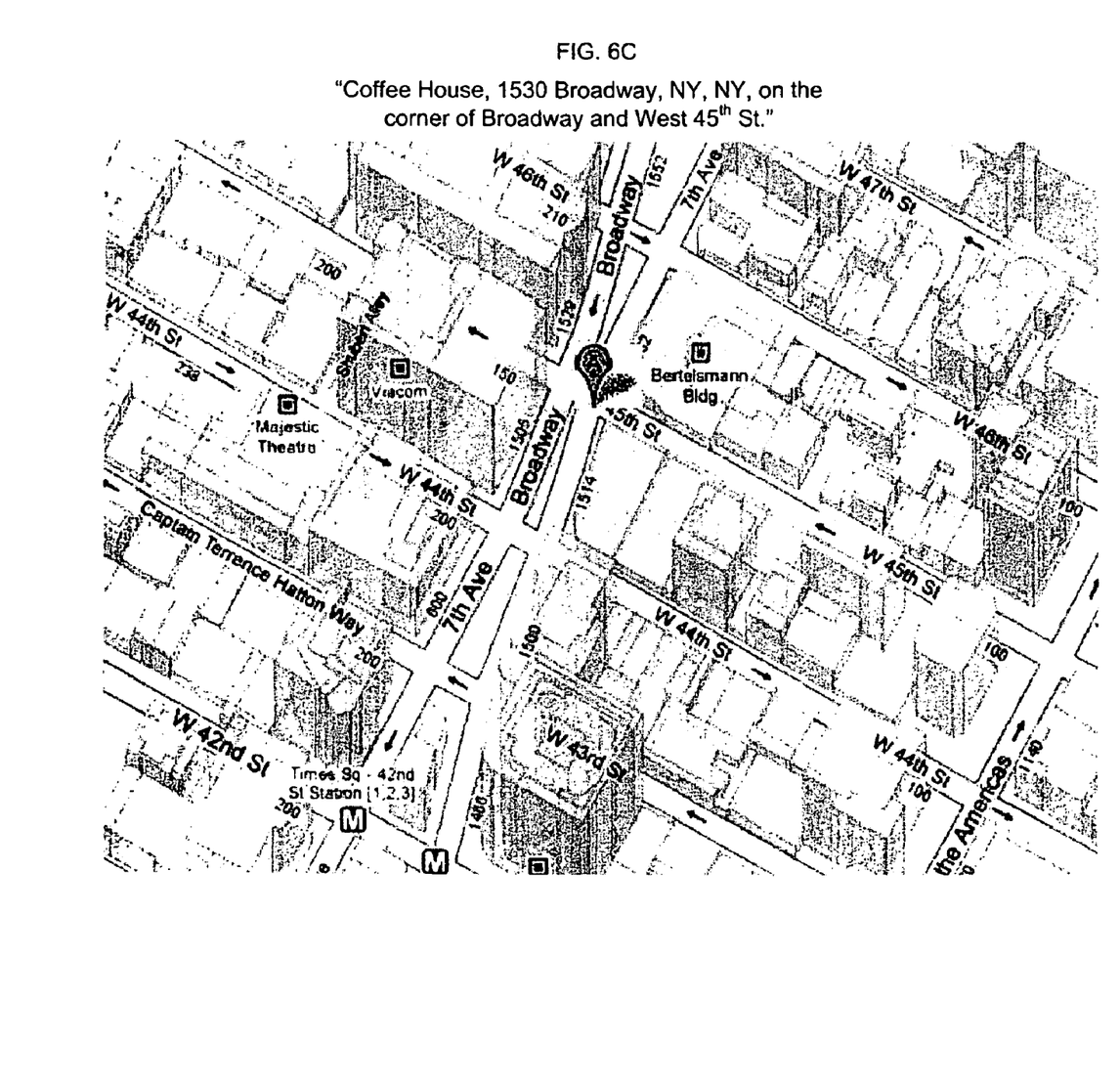

And in another example, if a user is interested in a particular point on a road, e.g. a business, the system may determine the distance between the location of the business and the endpoints of the road segment on which the business is located. The result may be reported with cross-street information taken into account. For instance, a search for a coffee shop on $8^{th}$ Avenue may be presented as "Coffee House, 684 $8^{th}$ Ave. between West $43^{rd}$ & West $44^{th}$" as shown in FIG. 6A. If the coffee shop is located closer to one end of a street than the other, it may be reported as "Coffee House, 304 West $58^{th}$ St., NY, N.Y., between $8^{th}$ and $9^{th}$ Avenues, closer to $8^{th}$ Avenue" as shown in FIG. 6B. And if the coffee shop is located at an intersection, it may be reported as "Coffee House, 1530 Broadway, NY, N.Y., on the corner of Broadway and West $45^{th}$ St." as shown in FIG. 6C.

Thus, the system may determine cross-streets for regions of interest and employ this information in response to mapping or driving direction requests. The user is provided with current, accurate location information showing relative placement of a point of interest. Different ways of reporting a given point of interest may exist, but weighting factors may be applied to provide clear and easy to remember location information.

Figure 7:
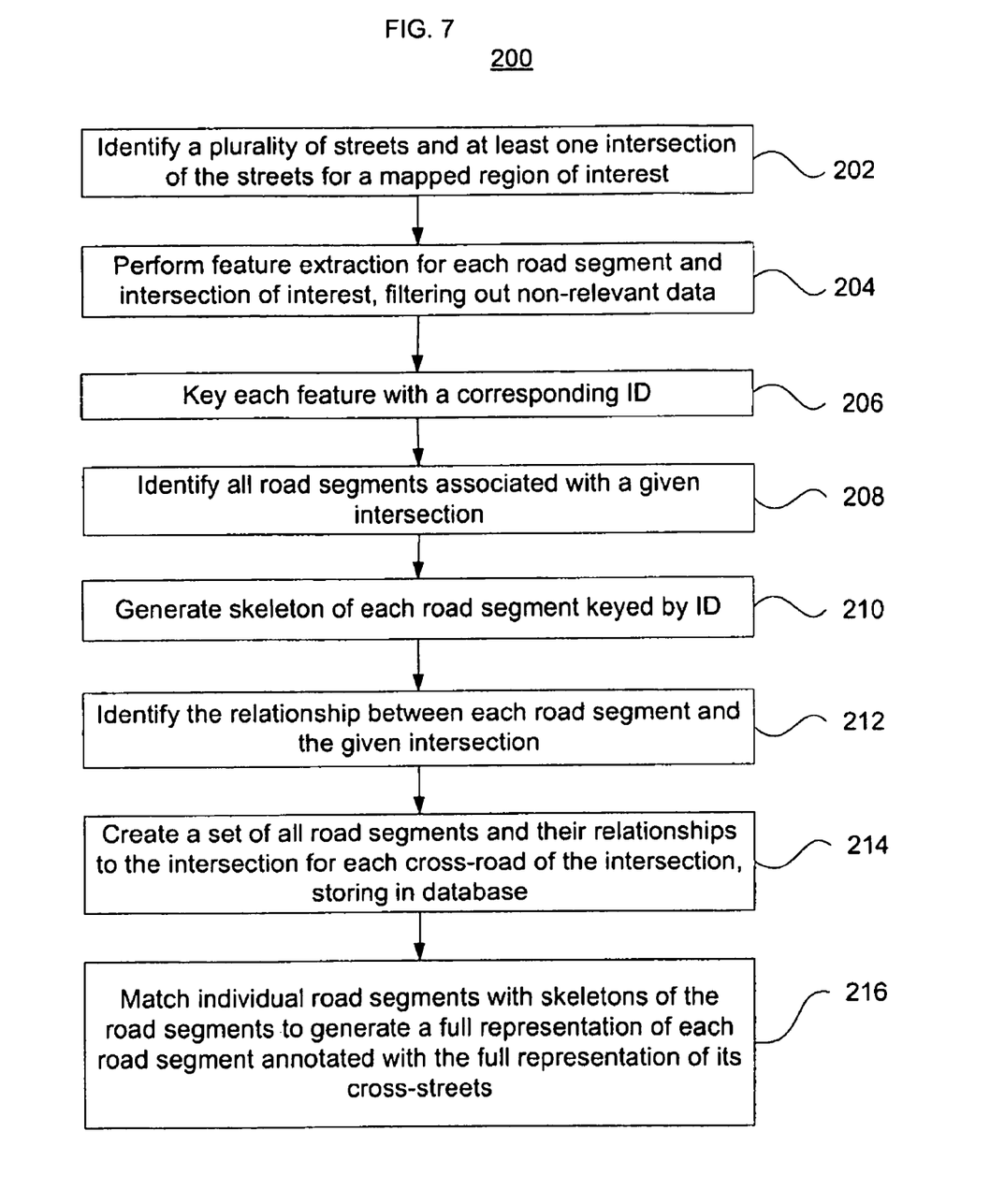
FIG. 7 is a flow diagram illustrating mapping processes in accordance with aspects of the invention.

FIG. 7 is a flow diagram 200 which shows certain processing operations that may be performed by a processing device, such as server 102, according to an embodiment of the invention. At block 202, an intersection and the streets which connect to the intersection are identified for a mapped region of interest. These streets and the intersection correspond to a specific physical location. At block 204, feature extraction is performed. In particular, for each road segment and intersection of interest, non-relevant data is filtered out. The non-relevant data may be any data not pertinent to the physical location of the segments or intersection. Next, as shown in block 206, each feature is keyed with a corresponding ID. Then, at block 208 all road segments associated with a given intersection are identified. For instance, with regard to FIG. 4B, road segments $R_1$, $R_2$ and $R_3$ are associated with intersection $I_1$, while road segments $R_1$ and $R_4$ are associated with intersection $I_2$.

As discussed above and as shown in block 210, a skeleton of each road segment is generated (keyed by ID). The relationship between each road segment and a particular intersection is identified in block 212. Then, as shown in block 214, a set of all road segments and their relationships to that intersection is created for each cross-road of the intersection. The results may be stored in a database, e.g., the cross-street database 134. Then, individual road segments are matched with the skeletons of the road segments to generate a full representation of each road segment annotated with the full representation of its cross-streets, as shown in block 216. These results may also be stored in the cross-street database.

Figure 8:
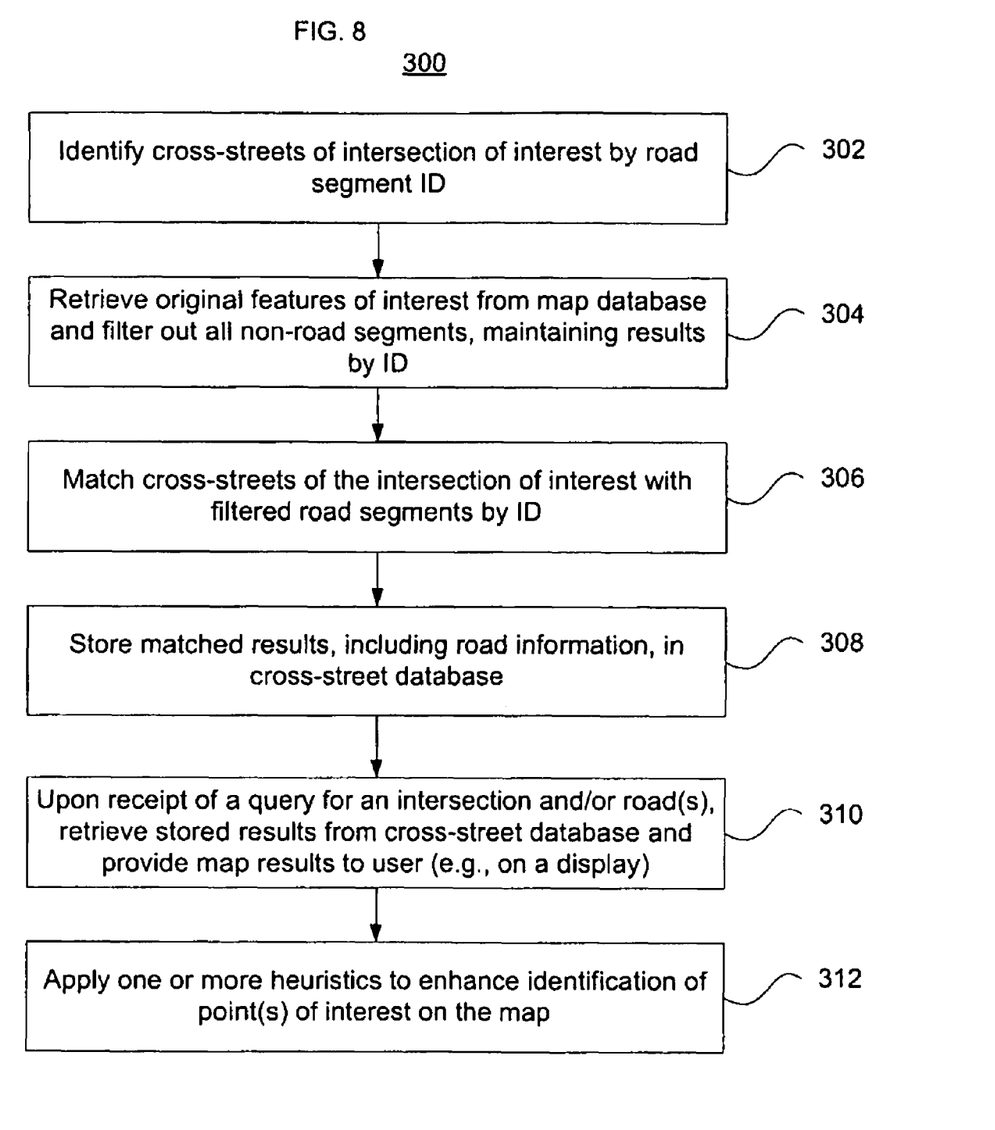
FIG. 8 is a flow diagram illustrating additional mapping processes in accordance with aspects of the invention.

FIG. 8 illustrates a flow diagram 300. Here, as shown in block 302, the cross-streets of an intersection of interest are identified by road segment ID. The original features of interest may be retrieved from a map database, e.g., database 132, as shown in block 304. Here, all non-road segments are filtered out. The results may be indexed by ID. As shown in block 306, the cross-streets of the intersection of interest are matched, by ID, with the filtered road segments. Then, as shown in block 308, the matched results, including any applicable road information (e.g., direction, coordinates, street name, etc.) is stored in a database such as cross-street database 134.

By way of example only, if a user requests a location or driving directions, the results stored in the cross-street database are retrieved as shown in block 310. The results, which may include a street address, may be displayed to the user as a map, such as shown in FIGS. 5-6. Furthermore, as shown in block 312, heuristics as discussed above may be applied to refine the results that are displayed. The heuristics may be preselected or preconfigured, or may be selectable or otherwise adjustable by the user.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. While certain operations and functions are shown in the figures and described herein as occurring in a particular order, such configurations are exemplary and different operations and functions may be performed in a different order or in parallel.

The invention claimed is:

1. A method, comprising:
identifying a plurality of streets and at least one intersection thereof, the plurality of streets and the at least one intersection being associated with a region of interest of a map, each of the plurality of streets including at least one road segment;
extracting features from a map database for each road segment and the at least one intersection;
creating, for each intersection of interest, a set of road segments connected to that intersection and a relationship of each road segment in the set to that intersection, including whether a given road segment begins or ends at the intersection;
storing the set of road segments and their relationships to the intersection of interest in a cross-street database;
identifying all cross-streets of the intersection of interest by road segment IDs, each cross street comprising at least one of the road segments;
retrieving original features of interest from the map database;
filtering non-road segments from the original features of interest to obtain a set of filtered road segments;
matching each cross-street of the intersection of interest with the filtered road segments; and
storing the matched cross-streets in the cross-street database.

2. The method of claim 1, wherein retrieving the original features, filtering the non-road segments and matching each cross-street are done by road segment ID.

3. The method of claim 1, further comprising:
retrieving selected matched cross-streets from the cross-street database in response to a user query;
applying a heuristic to the retrieved cross-streets to select a display option; and
displaying a geographical map on a display to identify cross-street information based upon the display option.

4. The method of claim 3, wherein the display option reports the cross-street information in increasing order of street numbers.

5. The method of claim 3, wherein the display option reports the cross-street information without mixing cardinal directions if alternative cross-streets that are on the same cardinal direction exist.

6. The method of claim 3, further comprising determining a distance between a point of interest on the geographical map and endpoints of the cross-street on which the point of interest is located.

7. The method of claim 6, wherein the display option reports a location of the point of interest in relation to the cross-street on which the point of interest is located.

8. A processing system for processing geographical map information, comprising:
at least one processor; and
memory for storing data, the memory being electrically coupled to the at least one processor;
wherein the at least one processor is configured to identify a plurality of streets and at least one intersection thereof, the plurality of streets and the at least one intersection being associated with a region of interest of a map, each of the plurality of streets including at least one road segment, to extract features from a map database for each road segment and the at least one intersection, to create, for each intersection of interest, a set of road segments connected to that intersection and a relationship of each road segment in the set to that intersection, including whether a given road segment begins or ends at the intersection, and to store the set of road segments and their relationships to the intersection of interest in a cross-street database in the memory; and
wherein the at least one processor is further configured to identify all cross-streets of the intersection of interest by road segment IDs, each cross street comprising at least one of the road segments, to retrieve original features of interest from the map database, to filter non-road segments from the original features of interest to obtain a set of filtered road segments, to match each cross-street of the intersection of interest with the filtered road segments, and to store the matched cross-streets in the cross-street database.

9. A computer-readable recording medium having instructions stored thereon, the instructions, when executed by a processor, cause the processor to perform the operations of:
identifying a plurality of streets and at least one intersection thereof, the plurality of streets and the at least one intersection being associated with a region of interest of a map, each of the plurality of streets including at least one road segment;

extracting features from a map database for each road segment and the at least one intersection;

creating, for each intersection of interest, a set of road segments connected to that intersection and a relationship of each road segment in the set to that intersection, including whether a given road segment begins or ends at the intersection;

storing the set of road segments and their relationships to the intersection of interest in a cross-street database;

identifying all cross-streets of the intersection of interest by road segment IDs, each cross street comprising at least one of the road segments;

retrieving original features of interest from the map database;

filtering non-road segments from the original features of interest to obtain a set of filtered road segments;

matching each cross-street of the intersection of interest with the filtered road segments; and storing the matched cross-streets in the cross-street database.

* * * * *